US012678644B2

(12) United States Patent
Shin

(10) Patent No.: US 12,678,644 B2
(45) Date of Patent: Jul. 14, 2026

(54) FIRE EXTINGUISHING SYSTEM FOR A BATTERY OF A VEHICLE

(71) Applicants: HYUNDAI MOTOR COMPANY, Seoul (KR); KIA CORPORATION, Seoul (KR)

(72) Inventor: Hyeon Gi Shin, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 843 days.

(21) Appl. No.: 18/089,301

(22) Filed: Dec. 27, 2022

(65) Prior Publication Data

US 2024/0091575 A1 Mar. 21, 2024

(30) Foreign Application Priority Data

Sep. 19, 2022 (KR) ........................ 10-2022-0117560

(51) Int. Cl.

| | |
|---|---|
| ***A62C 3/07*** | (2006.01) |
| ***A62C 3/16*** | (2006.01) |
| ***A62C 37/40*** | (2006.01) |
| ***A62C 99/00*** | (2010.01) |

(52) U.S. Cl.

CPC .................. *A62C 3/07* (2013.01); *A62C 3/16* (2013.01); *A62C 37/40* (2013.01); *A62C 99/0063* (2013.01)

(58) Field of Classification Search

CPC .. A62C 3/07; A62C 3/16; A62C 37/40; A62C 99/0063; A62C 2/04; A62C 37/38

See application file for complete search history.

(56) References Cited

U.S. PATENT DOCUMENTS

| | | | | |
|---|---|---|---|---|
| 11,715,963 B1 * | 8/2023 | Hays | ..................... | H02J 7/0042 169/54 |
| 2020/0086152 A1 * | 3/2020 | Stadler | .................. | H01M 50/30 |

FOREIGN PATENT DOCUMENTS

| | | | | |
|---|---|---|---|---|
| CN | 109513137 A * | 3/2019 | ............... | A62C 3/16 |
| CN | 114628839 A * | 6/2022 | ............... | A62C 3/16 |

* cited by examiner

*Primary Examiner* — Steven M Cernoch

(74) *Attorney, Agent, or Firm* — Lempia Summerfield Katz LLC

(57) ABSTRACT

A fire extinguishing system for a battery of a vehicle includes: a gas discharge part installed in a battery pack to discharge a gas inside the battery pack; a gas passage part through which a gas flow, the gas generated inside the battery pack when a fire occurs and discharged through the gas discharge part; a controller, which outputs a control signal for fire extinguishment when a fire occurs inside the battery pack; a vacuum pump installed in a gas passage part to operate according to the control signal outputted from the controller and to perform smothering extinguishment of fire inside the battery pack by sucking gas and air from inside the battery pack during operation; and a closed space part provided in the vehicle so that the gas and air sucked by the vacuum pump can be moved and stored thereto through the gas passage part.

16 Claims, 9 Drawing Sheets

FIG. 1 – Prior Art
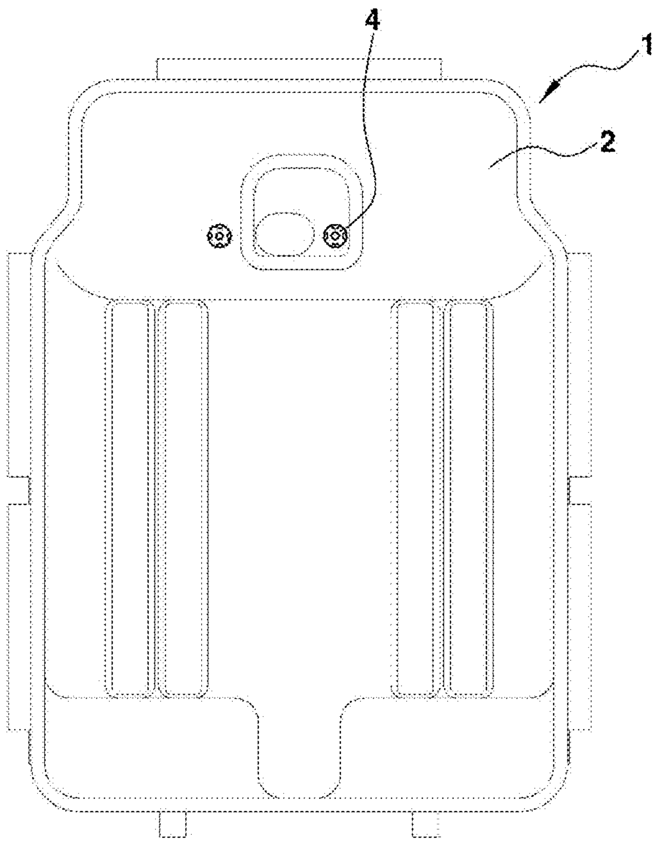
FIG. 2 – Prior Art
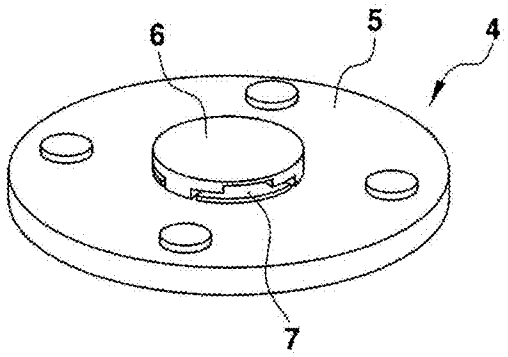

FIRE EXTINGUISHING SYSTEM FOR A BATTERY OF A VEHICLE

CROSS-REFERENCE TO RELATED APPLICATION

This application claims under 35 U.S.C. § 119(a) the benefit of priority to Korean Patent Application No. 10-2022-0117560 filed on Sep. 19, 2022, the entire contents of which are incorporated herein by reference.

BACKGROUND

(a) Technical Field

The present disclosure relates to a fire extinguishing system for a battery of a vehicle, and more particularly, to a fire extinguishing system for a battery of a vehicle capable of quickly and accurately sensing a fire occurring inside a battery pack and effectively extinguishing the fire immediately upon the sensing.

(b) Background Art

Recently, as interest in issues such as energy efficiency, environmental pollution, and fossil fuel depletion increases, eco-friendly vehicles that can substantially replace internal combustion engine vehicles are being developed.

Eco-friendly vehicles include: a battery electric vehicle (BEV) that uses a battery as a driving power source, a fuel cell electric vehicle (FCEV) that uses a fuel cell as a main power source, and a hybrid electric vehicle (HEV) that uses both an engine and a motor as a driving power source for driving the vehicle.

All of these eco-friendly vehicles (xEVs) have in common that they drive a motor with power charged in a battery for driving, and they can all be called electric vehicles in a broad sense. A high-voltage battery pack that supplies power to a motor is installed in such an electric vehicle. The high-voltage battery pack supplies power to electric power components in the vehicle, such as a motor, while repeatedly charging and discharging during the travel of the vehicle.

In general, a battery pack of an electric vehicle includes a battery case, a battery module disposed inside the battery case, and a battery management system (BMS). The BMS collects information such as voltage, current, and temperature of cells constituting the battery module and controls the operation of the cells. Besides, the battery pack has a configuration to prevent fire by blowing a fuse or blocking a relay connected to an inverter when an internal short circuit occurs or an overcurrent flows.

In electric vehicles, a fire may occur inside the battery pack while the electric vehicles are traveling due to various causes such as collisions or the malfunctioning of parts. If the fire in the battery pack is not properly extinguished, the vehicle may be completely burned, resulting in significant material damage and, potentially, human injury. Recently, as the use of electric vehicles increases, the risk of fire due to external impact or internal short circuit in the battery or surrounding high-voltage electrical wiring is increasing.

In particular, the fire in the battery can spread in a short time due to the internal and external structure materials and construction materials of the battery. Furthermore, in the case of public transportation, vehicles such as buses, which may have many passengers on board, prompt fire response for passenger safety is essential and failure to respond in the initial stage may lead to a major disaster.

Nevertheless, a response method of using a fire extinguisher is well known for response to a fire in a vehicle. Even in this case, if the driver fails to use the fire extinguisher in time, the initial fire extinguishing may fail, and the fire may spread to the entire vehicle. In the case of a fire that occurs in a battery, it is very difficult to completely extinguish a fire by using a small fire extinguisher or spraying a fire extinguishing agent due to the internal materials of the battery.

In addition, since the driver is inside the vehicle while driving, even if a fire does occur in the battery, it is difficult for the driver to be aware of the fire until a large amount of smoke is generated. Further, unlike passenger cars, buses have a large and long body, making it more difficult to determine whether a fire exist.

Furthermore, depending on the vehicle model, such as a large bus, there is an external structure for protection. For example, a case covering the battery cells in the battery pack may be mounted on the roof of the vehicle. Therefore, even if the driver recognizes the occurrence of a fire in time, it is difficult to inject the fire extinguishing agent into the battery case. Also, even if it is sprayed, the fire extinguishing agent may not reach the battery cells in the battery case properly, so effective fire extinguishment is impossible.

SUMMARY

Therefore, the present disclosure, conceived to solve the above problems, provides a fire extinguishing system for a battery of a vehicle capable of quickly and accurately sensing a fire occurring in a battery for a vehicle and effectively extinguishing the fire immediately upon the sensing.

The objects of the present disclosure are not limited to the above-described objects. Unmentioned or other objects may be appreciated clearly from the following detailed description by a person having ordinary skill in the art to which the disclosure belongs.

According to an embodiment of the present disclosure, in order to accomplish the above-described objects, a fire extinguishing system for a battery of a vehicle is provided. The system includes: a gas discharge part installed in a battery pack to discharge a gas inside the battery pack; a gas passage part through which a gas generated inside a battery pack when a fire occurs and discharged through the gas discharge part; and a controller. The controller outputs a control signal for fire extinguishment when a fire occurs inside a battery pack. The system also includes a vacuum pump installed in a gas passage part to operate according to a control signal outputted from the controller and to perform smothering extinguishment of fire inside a battery pack by sucking gas and air inside the battery pack during operation. The system also has a closed space part provided in a vehicle so that the gas and air sucked by the vacuum pump can be moved and stored thereto through the gas passage part.

Accordingly, with the fire extinguishing system of a battery for a vehicle according to the present disclosure, a fire generated in a vehicle battery can be quickly and accurately sensed, and the fire can be effectively extinguished immediately upon the sensing.

In addition, in the present disclosure, if a simple and inexpensive auxiliary fire sensor is installed for each battery pack, and a gas sensor (gas concentration measuring sensor) for measuring the gas concentration is installed in the common gas passage part to which each battery pack is connected, it is possible to both sense a battery fire and identify a battery pack in which a fire has occurred by using only a minimum gas sensor for a plurality of battery packs.

In addition, by using a low-cost auxiliary fire sensor to classify and identify a battery pack in which a fire has occurred and by installing a gas sensor in a common gas passage part and using it to finally confirm the occurrence of a battery fire, it is possible to prevent false detection of a fire and significantly reduce the cost compared to the prior art case of installing an expensive gas concentration measuring sensor for each battery pack.

In addition, since the fire extinguishing system of the present disclosure performs the function of a conventional pressure balancing element, the pressure balancing of the battery pack is possible without the need to install multiple pressure balancing elements in the battery pack.

BRIEF DESCRIPTION OF THE DRAWINGS

The above and other features of the present disclosure are now described in detail with reference to certain examples thereof illustrated in the accompanying drawings, which are given herein below by way of illustration only, and thus are not limitative of the present disclosure, and wherein:

FIG. 1 is a view illustrating a state in which a known pressure balancing element is installed in a battery case;

FIG. 2 is a perspective view showing a known pressure balancing element;

Figure 3:
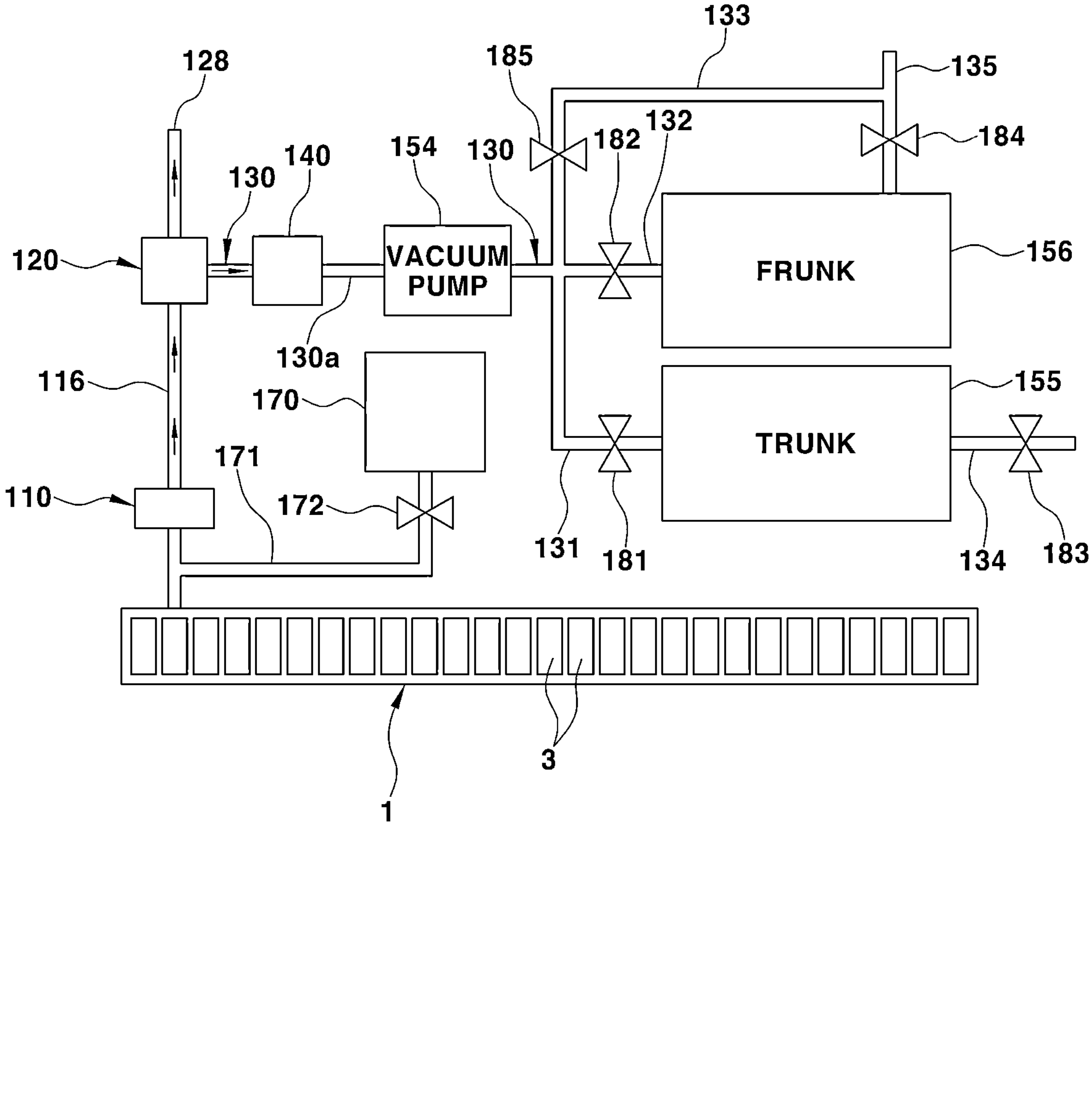
FIG. 3 is an overall configuration diagram of a fire extinguishing system according to an embodiment of the present disclosure.

It should be understood that the appended drawings are not necessarily drawn to scale, presenting a somewhat simplified representation of various advantageous features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent elements of the present disclosure throughout the several figures of the drawings.

DETAILED DESCRIPTION

Specific structural or functional descriptions presented in the embodiments of the present disclosure are provided merely by way of example for the purpose of describing embodiments according to the concept of the present disclosure. The embodiments according to the concept of the present disclosure may be realized in various forms. Additionally, the disclosure should not be construed as being limited to the embodiments described herein, but should be understood as including all changes, equivalents, and substitutes within the technical idea and scope of the present disclosure.

Terms such as first, second, and the like may be used to explain various components, but the components are not limited by these terms. The above terms are used only for the purpose of distinguishing one component from other components. For example, the first component can be designated as the second component without departing from the scope of the present disclosure, and, similarly, the second component can also be designated as the first component.

Further, when one component is referred to as being "connected" or "accessed" to another component, it should be understood that the one component may be directly connected or accessed to the other component or any intervening component may also be present therebetween. Contrarily, when one component is referred to as being "directly connected" or "directly accessed" to another component, it should be understood that no other component is present therebetween. Other expressions for describing the relationships between components, i.e., expressions such as "between" and "directly between" or "adjacent to" and "directly adjacent to" should be interpreted similarly.

The same reference numerals are used throughout the specification to designate the same components. As used herein, terms are for the purpose of describing the embodiments and are not intended to limit the present disclosure. Herein, terms in the singular form also relate to the plural form unless specifically stated otherwise in the context. As used herein, the terms "comprises" and/or "comprising" specify the presence of stated components, steps, operations, and/or components, but do not preclude the presence or addition of at least one other component, step, operation, and/or component. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure have been described with reference to the accompanying drawings.

The present disclosure is to provide a fire extinguishing system for a battery of a vehicle capable of quickly and accurately sensing a fire occurring inside a battery pack and effectively extinguishing the fire immediately upon the sensing.

If the occurrence of a fire in the battery pack of a vehicle can be sensed early, in the event of a fire, it is possible to warn the driver and passengers in a short time so that they can escape from the vehicle quickly and safely.

To this end, the fire extinguishing system according to the present disclosure is configured to sense a fire occurring in the battery pack at an early stage and then perform a warning and automatic fire extinguishment immediately upon the sensing.

A typical fire occurrence mechanism of a battery mounted in an electric vehicle is that when an overvoltage occurs in the battery or an external shock is applied, the separator may be disassembled, and the separator damage may lead to the thermal decomposition of the electrolyte solution.

At this time, a high-temperature flammable gas is emitted from the battery cell. By conducting a battery fire experiment, it can be found that the main component of the flammable gas is carbon monoxide (CO). The time at which such flammable gas is released is the time at which the fire can be extinguished in the initial stage.

Thereafter, when the gas expands in the battery and the gas and electrolyte solution leak out of the battery cell, thermal runaway may occur and the battery may explode. From this point on, it becomes almost impossible to extinguish the fire. Therefore, it is necessary to extinguish the fire at an early stage after quickly sensing the release of flammable gas by spraying a fire extinguishing agent to the battery pack where the fire occurred at the time of releasing the flammable gas.

In the present disclosure, a fire is sensed using the gas emitted from the battery cell in the initial stage to then be capable of extinguishing that fire in the battery cell, i.e., in the stage of releasing flammable gas. In other words, a gas emitted due to thermal decomposition of an electrolyte solution from a battery cell is sensed to determine the occurrence of a fire early.

At this time, a pressure balancing element installed in the battery pack is used for sensing the gas. A battery pack mounted on a vehicle is essentially equipped with the above-described pressure balancing element.

A typical vehicle battery pack includes a battery case and a battery module disposed inside the battery case, and the battery module is constituted with a plurality of unit cells, i.e., battery cells. Additionally, the battery cells constituting the battery module in the battery pack are kept sealed inside the battery case.

In this configuration, the internal temperature of the battery case may repeatedly rise and fall depending on the charging/discharging operation state of the battery cells. When the internal temperature rises and falls repeatedly, there may be a passage through which gas can enter and exit between the inside and the outside of the battery case.

Only when a gas entry and exit passage exists in the battery case can the internal pressure and external pressure of the battery case be equally maintained, thereby preventing the battery pack from expanding or contracting. To this end, the battery case of the battery pack is provided with a pressure balancing element that provides a passage for gas entry and exit between the inside and the outside.

FIG. 1 is a view illustrating a state in which a known pressure balancing element is installed in a battery case. As shown, a battery case 2 of a battery pack 1 is provided with a pressure balancing element 4 through which gas enters and exits between the inside and the outside of the battery case during normal times. The pressure balancing element 4 has a passage for gas entry and exit between the inside and the outside of the battery case 2.

A battery module (not shown) is accommodated in the battery case 2 shown in FIG. 1, and battery cells of the battery module are kept sealed by the battery case. In the battery pack 1, the internal temperature of the battery case 2 repeatedly rises and falls according to the charging/discharging operation states of the battery cells.

In order to prevent the battery case 2 from expanding or contracting, a plurality of pressure balancing elements 4 are installed in the battery case as shown, thereby allowing gas to enter and exit between the inside and outside of the battery case through the gas passage of the pressure balancing element during normal times (when there is no fire). Thereby, expansion and contraction of the battery case 2 can be prevented, and the pressure between the inside and the outside of the battery case can be maintained equally.

FIG. 2 is a perspective view showing a known pressure balancing element as a reference view for better understanding of the present disclosure. As shown, the known pressure balancing element 4 includes a plate 5 fixed in close contact with the outer surface of the battery case (reference numeral '2' in FIG. 1), and a vent part 6 integrally provided in the center of the plate 5.

In the known pressure balancing element 4 as described above, a plurality of vent holes 7 are formed through which gas can pass, as a passage for gas entry and exit between the inside and outside of the battery case. The vent holes 7 are formed in the vent part 6 located in the center.

Accordingly, pressure balancing can be performed between the inside and outside of the battery case while gas passes through each vent hole 7 of the vent part 6 with the plate 5 fixed to the outer surface of the battery case.

In the known pressure balancing element 4, the size of the vent holes is small in order to prevent external moisture from flowing into the battery case through the vent hole (gas passage) 7 formed in the vent part 6.

Accordingly, a plurality of small-sized vent holes is provided in each pressure balancing element 4 due to insufficient pressure adjusting (pressure balancing) performance by one vent hole 7. In addition, a plurality of pressure balancing elements for each battery pack are installed.

In the present disclosure, a pressure balancing element 4 and a vent valve 120 of a new configuration are used to discharge the gas generated from the battery cell in the event of a fire only to the passage where the gas sensor is located (gas passage part as described below) while performing the function of adjusting the pressure (pressure balancing) inside the battery pack as it is during normal times. The gas generated from the battery cell in the event of a fire is only discharged to the passage where the gas sensor is located, not to any external discharge.

FIG. 3 is an overall configuration diagram of a fire extinguishing system according to an embodiment of the present disclosure. FIG. 3 illustrates a fire extinguishing system that senses the occurrence of a fire in the battery pack 1 at an early stage and automatically performs fire extinguishment immediately upon the sensing.

Figure 4:
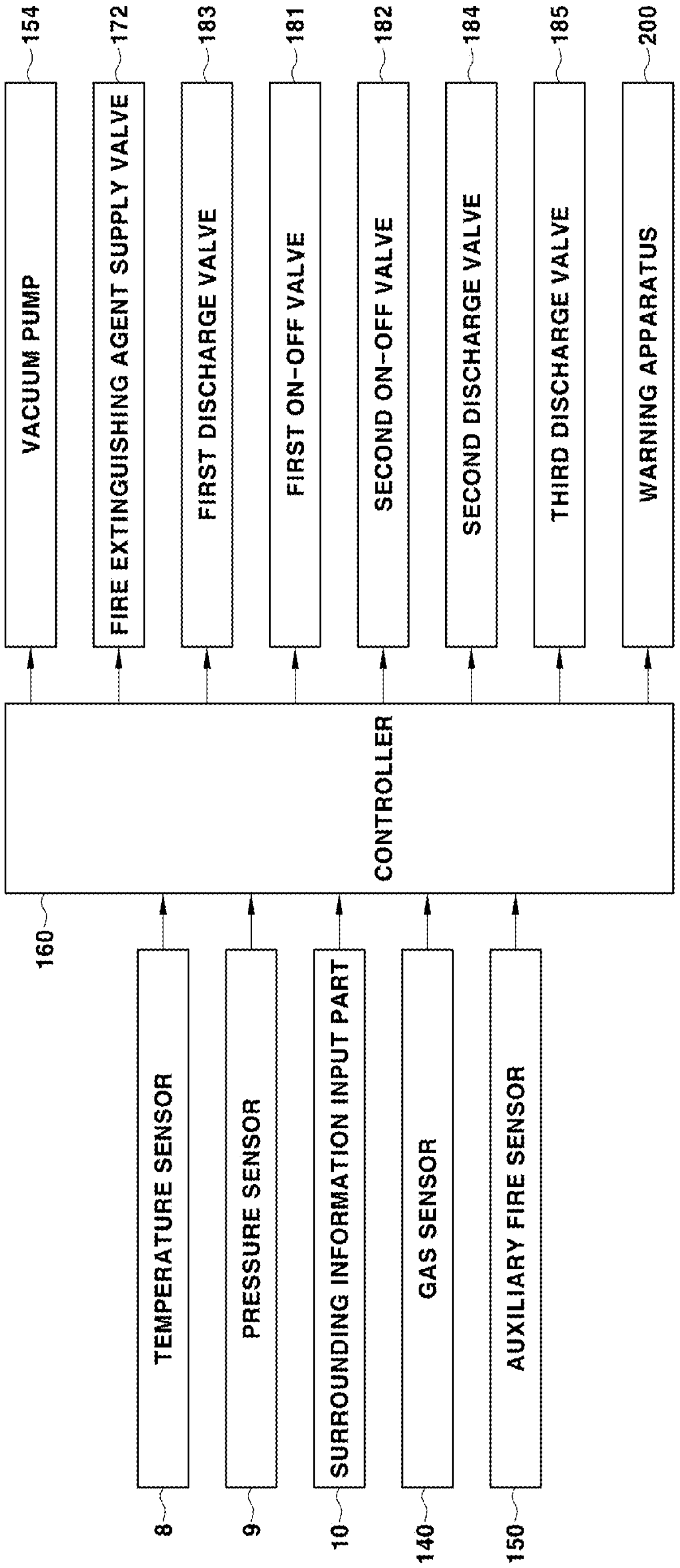
FIG. 4 is a block diagram showing a sensing element, a control element, and an operating element in the fire extinguishing system according to an embodiment of the present disclosure.

FIG. 4 is a block diagram showing a sensing element, a control element, and an operating element in the fire extinguishing system according to an embodiment of the present disclosure. Reference numeral '8' denotes a temperature sensor installed in the battery pack to detect the temperature of a battery cell. Reference numeral '9' denotes a pressure sensor installed in the battery pack to detect an internal pressure of the battery pack.

In the present disclosure, when flammable gas is generated at the initial stage of a fire in the battery pack 1, the vacuum pump 154 is operated to create a vacuum state or condition inside the battery pack to extinguish the fire. At this time, by using the vacuum pump 154 to suck in both the flammable gas generated from the battery pack 1 and the air inside the battery pack to create a vacuum state inside the battery pack, the fire generated inside the battery pack is extinguished by smothering, i.e., oxygen deprivation.

Oxygen in the air is required for combustion, but if the supply of oxygen is cut off, combustion cannot continue naturally. The extinguishing method using this principle is called smothering extinguishment. Examples of a method of blocking the supply of air (oxygen) include blocking by closing an open part into the air, blocking between combustion materials and air by carbon dioxide gas or bubbles, or the like.

Combustion can occur when all of combustibles, oxygen, and a heat source above the ignition point exist as a combustion condition. In the present disclosure, air (oxygen) and the flammable gas (combustible) are generated inside the battery pack at the initial stage of a fire of the battery pack 1. The air and the flammable gas are moved to and temporarily stored in closed space parts 155 and 156 in the vehicle that maintain a temperature below the ignition point. After the vehicle moves to a safe place, the flammable gas and air stored in the closed space parts 155 and 156 are discharged to the outside of the vehicle through discharge passage parts 134 and 135.

At this time, the herein-described vacuum pump 154 is used to suck in the flammable gas and air inside the battery pack 1 and move them to the closed space parts 155 and 156 in the vehicle designated in advance. The vacuum pump 154 is also used to create a vacuum, i.e., a vacuum state, inside of the battery pack at the same time as moving the gas and air to the closed space parts 155 and 156. By using the vacuum pump 154 to create the inside of the battery pack 1 a vacuum state, combustion is stopped, and the smothering extinguishment takes place inside the battery pack.

If the vehicle passes a place where there are no people around, such as a national road or a highway, the flammable gas and air (oxygen) sucked by the vacuum pump 154 are not moved to the closed space parts 155 and 156 in the vehicle, but may be discharged into the atmosphere in real time through the discharge passage part 135 connected to the outside of the vehicle.

At this time, when the vehicle passes a child protection area or a place where there are nearby people, the flammable gas and air are moved to and temporarily stored in the closed space parts 155 and 156 in the vehicle. After the vehicle moves to a safe place, the flammable gas and air stored in the closed space parts 155 and 156 may be discharged to the outside of the vehicle through the discharge passage parts 134 and 135.

In addition, by setting the herein-mentioned smothering extinguishment as the primary (e.g., first) fire extinguishment and a cooling fire extinguishment of spraying a fire extinguishing agent into the battery pack as the secondary (e.g., second) fire extinguishment, the first fire extinguishment (smothering extinguishment) may be carried out first. Additionally, in the case of failure of the first fire extinguishment (including fire re-ignition), the second fire extinguishment (cooling fire extinguishment) of spraying the fire extinguishing agent inside the battery pack may be performed.

When describing in detail the configuration of the fire extinguishing system for performing the herein-mentioned smothering extinguishment, the fire extinguishing system according to the embodiment of the present disclosure includes a gas discharge part provided in the battery pack 1 to discharge gas inside the battery case 2.

In an embodiment of the present disclosure, the gas discharge part may be a pressure balancing element 110 installed in the battery case 2 to provide a passage for gas entry and exit between the inside and the outside of the battery case.

Figure 5:
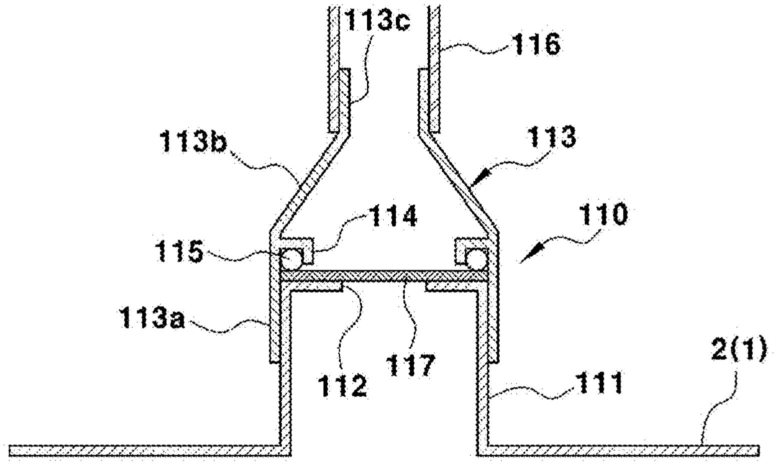
FIG. 5 is a cross-sectional view showing a pressure balancing element installed in a battery case of a battery pack in an embodiment of the present disclosure.

FIG. 5 is a cross-sectional view showing a pressure balancing element installed in a battery case of a battery pack in an embodiment of the present disclosure. As shown, the pressure balancing element 110 includes a vent part 111 provided in the battery case 2 of the battery pack 1. The vent part 111 has a vent hole 112 formed therein through which gas can pass between the inside and the outside of the battery case 2. The pressure balancing element 110 also includes a connector 113 coupled to the vent part 111 so that its inner space communicates with the vent hole 112 of the vent part 111, and a vent passage part 116. The vent passage part 116 is installed as a structure extending from the connector 113 by a certain length and whose inner passage communicates with the inner space of the connector 113, the vent hole 112, and the inner space of the vent part 111.

As described herein, in the known pressure balancing element 4, the vent hole 7 of the vent part 6 that is formed as a gas passage is formed with a very small size and small flow passage cross-sectional area to prevent moisture inflow. In contrast to the pressure balancing element 110 of the present disclosure, the vent hole 112 has a relatively large size and flow passage cross-sectional area that is formed in the vent part 111. The connector 113 extends from the vent hole 112 by a certain length from the vent passage part 116. Thus, if the airtightness is maintained only in the connection part of these components, there is little possibility that moisture may flow into the interior of the battery case 2 through the vent passage part 116 of a certain length.

In an embodiment, the vent hole 112 of the vent part 111 may be provided with a ventilation waterproofing membrane member 117 that blocks the inflow of external moisture while allowing gas to pass therethrough. Also, the ventilation waterproofing membrane member 117 is installed to block the vent hole 112 of the vent part 111 as shown in FIG. 5.

The ventilation waterproofing membrane member 117 in the embodiment of the present disclosure may be a fluororesin film, specifically, a ePTFE (expanded polytetrafluoroethylene) film known under the trade name of Gore-Tex. The ventilation waterproofing membrane member 117 may be a film-like member that allows gas to pass therethrough while blocking moisture.

It is advantageous to use the ventilation waterproofing membrane member 117 because it can block the moisture existing outside the battery case from flowing in through the vent hole 112 of the vent part 111 while also discharging the moisture inside the battery case 2.

The vent part 111 may be formed in a tubular shape protruding outward from the surface of the battery case 2, and the vent hole 112 of a predetermined diameter or size is formed at the protruding end of the vent part 111. In an embodiment of the present disclosure, the vent part 111 may be formed in a tube having a circular cross-section, i.e., in a circular tube shape from the surface of the battery case 2 to the outside.

The connector 113 includes a large-diameter part 113*a* having a relatively large diameter at one end, a small-diameter part 113*c* having a smaller diameter than that of the large-diameter part 113*a* at the other end, and a reduced pipe part 113*b* having a shape in which the diameter is gradually reduced and connecting the large-diameter part 113*a* and the small-diameter part 113*c*.

The large-diameter part 113*a* may be screwed to the outer peripheral surface of the vent part 111. For this purpose, threads may be formed on the inner peripheral surface of the large-diameter part 113*a* and the outer peripheral surface of the vent part 111. In addition, when the small-diameter part 113*c* is coupled to the vent passage part 116, the inner peripheral surface of the small-diameter part 113*c* may be coupled to the outer peripheral surface of the vent passage part 116. Alternatively, the outer peripheral surface of the small-diameter part 113*c* may be coupled to the inner peripheral surface of the vent passage part 116.

In this case, both surfaces of the small-diameter part 113*c* and the vent passage part 116 may be coupled and fixed by thermal fusion. A tubular member such as a hose or tube may be used as the vent passage part 116, and one made of a material capable of being thermally fused to the connector 113 may be used.

In addition, a sealing protrusion 114 may be formed on the inner peripheral surface of the connector 113 to protrude inward in the radial direction. The connector 113 and the vent part 111 are screwed together so that the ventilation waterproofing membrane member 117 is pressed to the vent part 111 with the sealing protrusion 114 interposed therebetween by the sealing member 115. The sealing member 115 is installed to maintain airtightness (sealing) between the connector 113, the vent part 111, and the ventilation waterproofing membrane member 117. The sealing member 115 may be an O-ring made of a material having elasticity, such as rubber.

The ventilation waterproofing membrane member 117 is installed to be seated on the outer surface of the protruding end of the vent part 111. When the large-diameter part 113*a* of the connector 113 is screwed onto the outer peripheral surface of the vent part 111, it is pressed against the vent part 111 by the sealing protrusion 114 and the sealing member 115. The edge part of the ventilation waterproofing membrane member 117 is pressed by the sealing protrusion 114 and the sealing member 115 to be fixed to the outer surface of the protruding end of the vent part 111.

In an embodiment of the present disclosure, the sealing protrusion 114 may be formed to have an L shape of a cross-section '¬' with one side open on the inner peripheral surface of the large diameter part 113*a* of the connector 113. Accordingly, in a state in which the circular sealing member 115 is inserted into the sealing protrusion 114 having the shape of the cross-section '¬', when the large diameter part 113*a* of the connector 113 is screwed into the vent part 111, the sealing member 115 can press the ventilation waterproofing membrane member 117 through the opening part of the sealing protrusion 114.

In the present disclosure, it is possible to relatively freely design the size of the vent hole 112, which is a gas passage through which the gas passes. In particular, since it is possible to form the vent hole 112 to be larger than the vent hole 112 of the known pressure balancing element 110, in the present disclosure, there is an advantage that the number of pressure balancing elements per battery pack can be reduced to one.

As shown in FIG. 3, the fire extinguishing system according to an embodiment of the present disclosure may further include a vent valve 120 installed at the outlet side of the vent passage part (reference numeral '116' in FIG. 5) of the pressure balancing element 110 installed in the battery pack 1. The fire extinguishing system may further include a gas passage part 130 that is installed to extend from the vent valve 120.

In addition, the fire extinguishing system according to the embodiment of the present disclosure includes the gas sensor 140 installed in the gas passage part 130. The system also includes the vacuum pump 154 installed in the gas passage part 130 to suck in flammable gas and air from the battery pack 1 through the gas passage part. The system further includes the closed space parts 155 and 156 provided in the vehicle to receive and temporarily store flammable gas and air sucked in by the vacuum pump 154 through the gas passage part 130.

In addition, the fire extinguishing system according to the embodiment of the present disclosure may further include a fire extinguishing agent tank 170 in which a fire extinguishing agent for extinguishing a fire in the battery pack 1 is stored, a controller 160 that outputs a control signal for extinguishing a fire on the battery pack 1 in which a fire has occurred when a fire is detected by the gas sensor 140, and a fire extinguishing agent supply valve 172. The fire extinguishing agent supply valve 172 is controlled to operate so that the fire extinguishing agent stored in the fire extinguishing agent tank 170 can be supplied to the battery pack 1 according to the control signal outputted from the controller 160.

The fire extinguishing agent tank 170 is connected to the battery pack 1 through the fire extinguishing agent supply passage part 171. The fire extinguishing agent supply passage part 171 is connected to a passage between the battery pack 1 and the pressure balancing element 110. In addition, a fire extinguishing agent supply valve controlled by the controller 160 is installed in the fire extinguishing agent supply passage part 171. The controller 160 may be a battery management system (BMS).

The gas sensor 140 is installed in the gas passage part 130 between the vent valve 120 and the vacuum pump 154. The gas sensor 140 senses the gas generated in the battery pack 1 and the gas discharged through the gas passage part 130.

Figure 6:
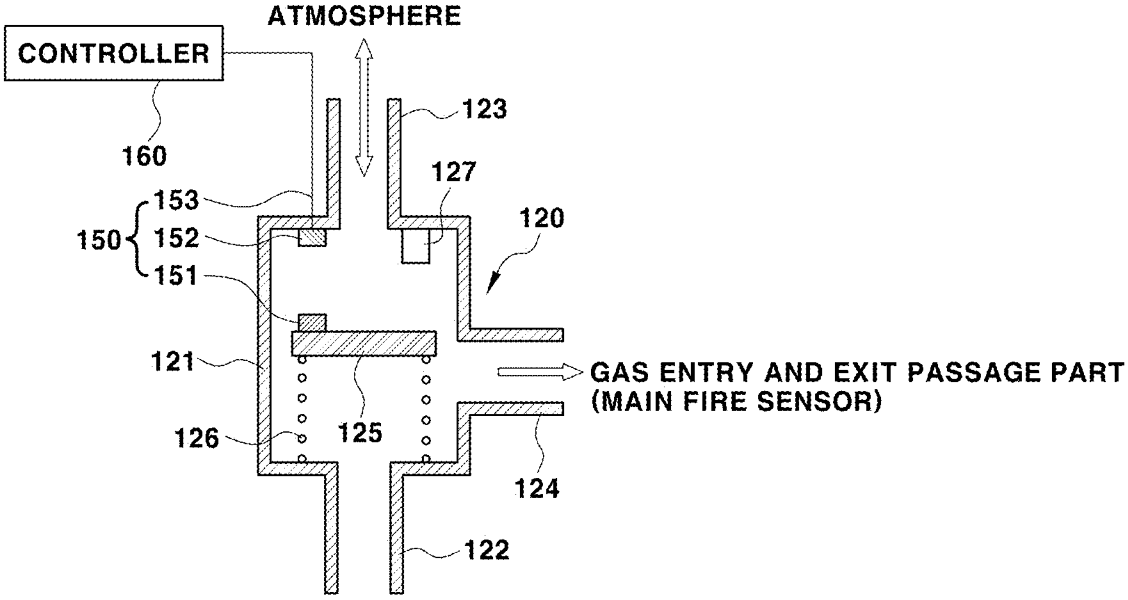
FIG. 6 is a cross-sectional view showing the state of a vent valve during normal times in a fire extinguishing system according to an embodiment of the present disclosure.
Figure 7:
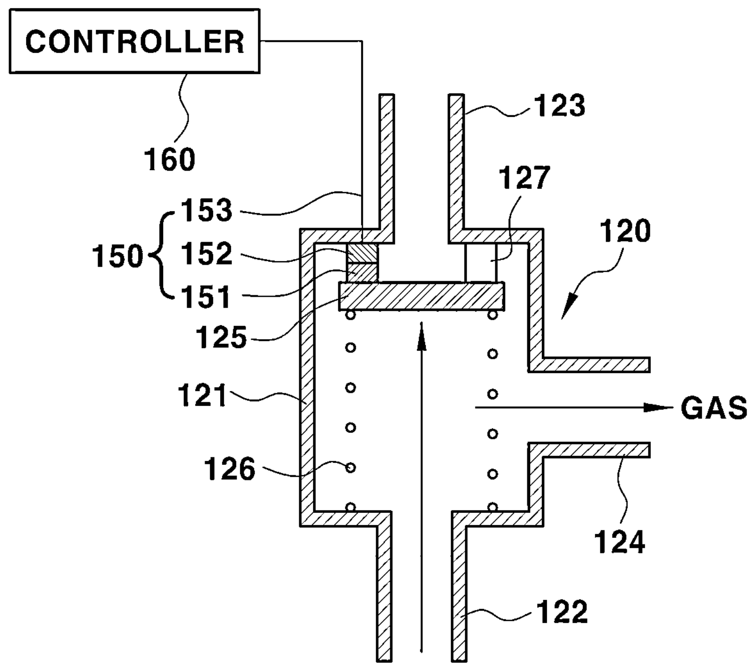
FIG. 7 is a cross-sectional view showing a state of a vent valve when a fire occurs in a fire extinguishing system according to an embodiment of the present disclosure.

FIG. 6 is a cross-sectional view showing the state of a vent valve during normal times in a fire extinguishing system according to an embodiment of the present disclosure. FIG. 7 is a cross-sectional view showing a state of a vent valve when a fire occurs in a fire extinguishing system according to an embodiment of the present disclosure.

As shown, the vent valve 120 includes a valve housing 121 provided with a vent port 122 connected to the vent passage part 116 of the pressure balancing element 110, an atmosphere port 123 connected to the atmosphere side, and a connection port 124 to which the gas passage part 130 is connected. A valve body 125 is installed in the inner space of the valve housing 121 and is configured to move to close the atmosphere port 123 by the gas discharged from the battery pack 1 when a fire occurs. A spring 126 is installed to support the valve body 125 in the inner space of the valve housing 121.

The valve housing 121 is connected so that its inner space communicates with the inner space of the vent passage part 116. Accordingly, the inner space of the valve housing 121 communicates with the inner space of the vent passage part 116 of the pressure balancing element 110 and the inner space of the connector 113. The inner space of the valve housing 121 also communicates with the inner space of the vent part 111 and the inner space of the battery case 2 with the ventilation waterproofing membrane member 117 interposed therebetween.

The atmosphere port 123 in the vent valve 120 may be formed to be located at the upper end of the valve housing 121. An entry and exit passage part (reference numeral '128' in FIG. 3) through which air enters from and exits to the atmosphere may be connected to the atmosphere port 123.

In the vent valve 120, the connection port 124 may be formed to be located on a side surface of the valve housing

121. In the vent valve 120, the valve body 125 is positioned to open the atmosphere port 123 during normal times and is positioned to be always in an open state with respect to the connection port 124.

The spring 126 is installed to be positioned below the valve body 125 and maintains the valve body 125 at a position where the atmosphere port 123 and the connection port 124 are opened. In particular, the spring 126 maintains the position of the valve body 125 so that, in the case of the connection port 124, it is always in an open position not only when a fire occurs but also during normal times.

As can be seen in FIGS. 6 and 7, the valve body 125 is provided in the shape of a plate 5 and is installed in the inner space of the valve housing 121 in the transverse direction. The spring 126, which is disposed at a lower side thereof, is disposed between the valve housing 121 and the valve body 125 so as to support the valve body 125.

As described above, the connection port 124 is a port that is always open regardless of whether a fire occurs, whether gas is discharged from the battery pack 1, and the position of the valve body 125. Referring to FIG. 6, it can be seen that the normal position of the valve body 125, supported by the spring 126, is higher than the position of the connection port 124. Accordingly, the connection port 124 becomes a port which is always open rather than a port closed by the valve body 125.

In contrast, the atmosphere port 123 is a port, which is opened and closed by the valve body 125. During normal times, the valve body 125 opens the atmosphere port 123, but when a fire occurs, the valve body 125 closes the atmosphere port 123.

When a fire occurs, the gas generated from the battery pack 1 passes through the pressure balancing element 110 and then flows into the valve housing 121 of the vent valve 120 through the vent port 122. The inflow gas thus pushes the valve body 125 upward. At this time, the valve body 125 overcomes the force of the spring 126 and moves toward the atmosphere port 123 to close the atmosphere port 123. The connection port 124 maintains an open state regardless of the position of the valve body 125, even when a fire occurs.

Accordingly, when the atmosphere port 123 is in an open state, the inner space of the atmosphere port 123 and the valve housing 121, the inner space of the vent passage part 116 of the pressure balancing element 110 and the inner space of the connector 113, and the inner space of the vent part 111 with the ventilation waterproofing membrane member 117 interposed therebetween are used as a gas passage for pressure balancing between the inside and the outside of the battery case 2.

During normal times, as shown in FIG. 6, gas enters and exits between the inside and outside of the battery pack 1 through the pressure balancing element 110 and the vent valve 120 in the state in which the atmosphere port 123 is opened. Thus, a pressure is balanced between the inside and the outside of the battery pack 1.

When a fire occurs, as shown in FIG. 7, the atmosphere port 123 is closed by the valve body 125, so that the gas generated from the battery pack 1 is not discharged to the atmosphere. At this time, the gas generated from the battery pack 1 can be discharged only through the connection port 124, which is always open. The gas discharged through the connection port 124 in this way flows to the gas sensor 140 along the gas passage part 130.

Accordingly, the gas sensor 140 can sense a fire occurring in the battery pack through the gas flowing along the gas passage part 130 and outputs a fire sensing signal when the fire is sensed.

In addition, the controller 160 can determine that a fire has occurred from the fire detection signal outputted from the gas sensor 140. The gas is a gas generated in the battery pack 1 at the initial stage of the fire and, more specifically, is a flammable gas generated in the battery cell 3 accommodated in the battery case 2. The main component of the flammable gas is carbon monoxide (CO).

In an embodiment of the present disclosure, the auxiliary fire sensor 150 may be configured in the vent valve 120. The auxiliary fire sensor 150 is for detecting the occurrence of fire inside the battery pack 1 separately from the gas sensor 140.

As shown in FIGS. 6 and 7, the auxiliary fire sensor 150 may include a first magnet resistor 151 installed in the valve body 125 and a second magnet resistor 152 fixedly installed at a position near the atmosphere port 123 of the inner surfaces of the valve housing 121 so that, when the valve body 125 is moved to the position to close the atmosphere port 123, the first magnet resistor 151 can be attached. The auxiliary fire sensor 150 may include a wiring 153 electrically connecting the first magnet resistor 151 and the controller 160.

Although not shown in the drawings, the controller 160 may include a current applying part for applying a current to the wiring 153 connected to the first magnet resistor 151 and may include a current detection part for detecting a current value applied to the wiring 153. Accordingly, in the controller 160, a current of a value determined by the current applying part can be applied through the wiring 153. At the same time, the value of the current flowing through the wiring 153 can be detected by the current detection part.

Referring to FIGS. 6 and 7, it can be seen that the first magnet resistor 151 is attached to one side of the valve body 125 and the second magnet resistor 152 is attached at one side location on the inner surface of the valve housing 121 opposite to the first magnet resistor 151. In this structure, a buffer member 127 may be installed on the other side of the valve body 125 or the other side of the inner surface of the valve housing 121.

The buffer member 127 may be made of a material having elasticity and shock absorption performance, such as rubber. As shown in FIG. 7, the buffer member 127 prevents direct contact between the valve body 125 and the valve housing 121 and serves to absorb an impact between the valve body 125 and the valve housing 121 when a fire occurs and the valve body 125 rises upward in the drawings by the force of the gas to close the atmosphere port 123.

Figure 8:
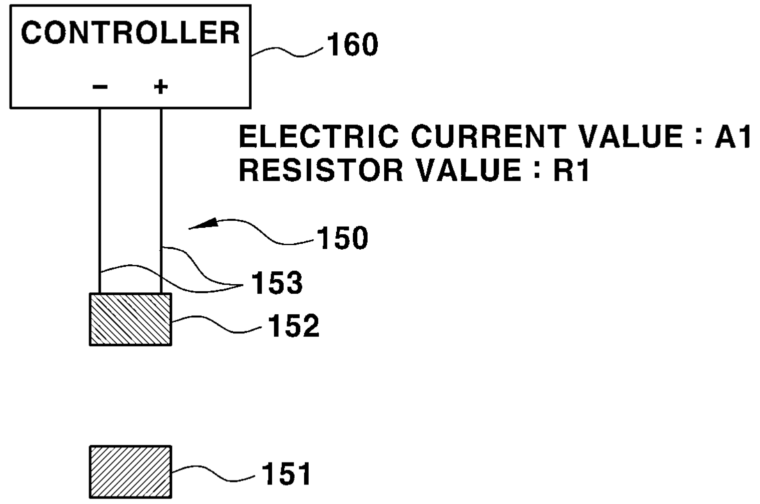
FIG. 8 is a view showing the normal state (when no fire occurs) of an auxiliary fire sensor provided in the vent valve in an embodiment of the present disclosure.
Figure 9:
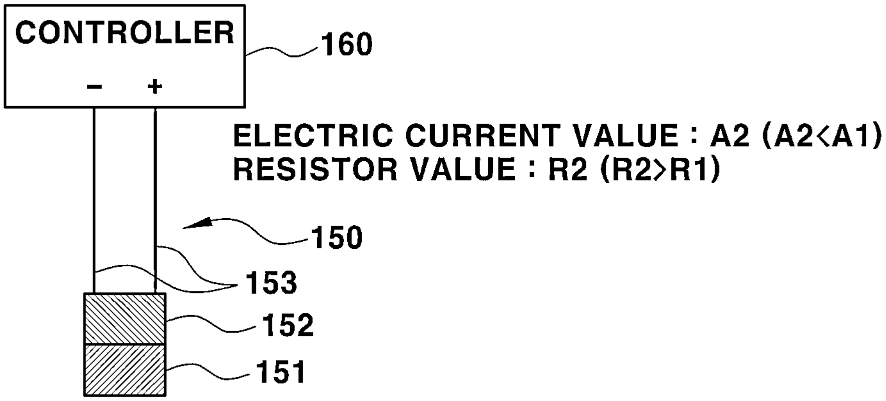
FIG. 9 is a view showing the operation state of the auxiliary fire sensor provided in the vent valve in the case of a fire in an embodiment of the present disclosure.

FIG. 8 is a view showing the normal state (when no fire occurs) of the auxiliary fire sensor provided in the vent valve 120 in an embodiment of the present disclosure. FIG. 9 is a view showing the operation state of the auxiliary fire sensor provided in the vent valve 120 in the case of a fire in an embodiment of the present disclosure.

During normal times, as shown in FIG. 8, when current is applied from the controller 160 through the wiring 153, only the wiring 153 and the second magnet resistor 152 of the valve housing 121 are electrically connected. On the other hand, when a fire occurs, the valve body 125 rises by the gas generated from the battery pack 1 and the atmosphere port 123 is closed so that, as shown in FIG. 9, the first magnet resistor 151 is attached to the second magnet resistor 152 by a magnetic force.

In this way, when the first magnet resistor 151 and the second magnet resistor 152 are attached and in contact with each other, the resistor value on the conduction path is increased by the entire first magnet resistor 151 and the second magnet resistor 152. Thus, the value of the current flowing through the wiring 153 (i.e., the current strength) is changed.

In other words, when the first magnet resistor 151 and the second magnet resistor 152 are apart from each other and the current flows through the path of only the wiring 153 and the first magnet resistor 151, the value of the current (reference current value) A1 will be relatively high. On the other hand, when the first magnet resistor 151 and the second magnet resistor 152 are in contact with each other, the total resistor value increases and the current flowing through the wiring 153, the first magnet resistor 151, and the second magnet resistor 152 (actual current value) A2 becomes lower than when the two magnet resistors are apart from each other.

Accordingly, the controller 160 reads the value of the current flowing through the wiring 153 (the signal value of the auxiliary fire sensor) and is set to determine that a fire has occurred when the value of the current is less than or equal to the set value. When the value of the detected current falls below the set value, the controller 160 may determine that a fire has occurred.

Alternatively, the controller 160 may be set to determine that a fire has occurred when the amount of change in the current value is greater than or equal to a set amount. As described above, the controller 160 may read the value of the current flowing through the wiring 153 of the auxiliary fire sensor 150 and first determine whether or not a fire has occurred in the battery pack 1 from the amount of change in the current value.

Although only one battery pack 1 is illustrated in FIG. 3, a fire extinguishing system may be configured for a plurality of battery packs mounted on a vehicle. In other words, the pressure balancing element 110, the vent valve 120, and the entry and exit passage part 128 may be installed for each of the plurality of battery packs 1.

At this time, after the gas passage parts are connected to the connection ports 124 of each respective vent valve 120, the gas passage parts are combined into one gas passage part 130. The one combined gas passage part 130 is connected to the inlet of the vacuum pump 154. The gas sensor 140 is installed in the one gas passage part 130 connected to the inlet of the vacuum pump 154.

The fire extinguishing agent supply passage part 171 is connected between the fire extinguishing agent tank 170 and each battery pack 1. A plurality of the fire extinguishing agent supply valves 172 are installed one by one (e.g., individually) in the fire extinguishing agent supply passage part 171 that is connected between the fire extinguishing agent tank 170 and each respective battery pack 1.

In the fire extinguishing system configured for the plurality of battery packs 1, together with the pressure balancing element 110 and the vent valve 120, the auxiliary fire sensor 150 that is installed in the vent valve 120 is also installed individually for each respective battery pack 1.

As a result, the controller 160 can determine in which battery pack a fire has occurred by the signal of the auxiliary fire sensor 150 installed for each battery pack 1. In other words, in the entire battery pack 1, when the current value, which is the signal value of the auxiliary fire sensor 150, is less than or equal to the set value or the amount of change in the current value is equal to or greater than the set amount, it can be determined that the corresponding battery pack is a battery pack in which the fire has occurred.

The gas sensor 140 installed in the gas passage part 130 may be a sensor for sensing gas generated from the battery cell 3 when a fire occurs. The gas sensor 140 may be, for example, a carbon monoxide measuring sensor for detecting the concentration of carbon monoxide (CO).

The gas sensor 140 is connected to the controller 160 and is provided to input a signal according to the fire sensing to the controller. Accordingly, the controller 160 can recognize that a fire has occurred inside the battery pack 1 from the signal of the gas sensor 140.

For example, the controller 160 may determine that a fire has occurred inside the battery pack 1 when the concentration Z1 of carbon monoxide in the gas sensed by the gas sensor 140 is greater than or equal to a set concentration.

Accordingly, as described above, the controller 160 can identify the battery pack in which the actual fire occurred among all the battery packs 1 mounted in the vehicle from the signal of the auxiliary fire sensor 150. It can be finally determined that a fire has occurred in the battery pack 1 mounted on the vehicle from the signal of the gas sensor 140.

The gas passage part 130 includes a first passage part 130*a* connected from the connection port 124 of the vent valve 120 to the suction port of the vacuum pump 154. The gas passage part 130 also includes a second passage part connected from the discharge of the vacuum pump 154 to the closed space parts 155 and 156 of the vehicle. The gas sensor 140 is installed in the first passage part 130*a*.

In an embodiment of the present disclosure, a plurality of closed space parts 155 and 156 are provided in the vehicle so that their insides can be sealed may be used. As such, when the plurality of closed space parts 155 and 156 that are provided in the vehicle are used, the second passage part may be configured to include a plurality of branch passage parts 131 and 132 that are branched and connected to the respective closed space parts 155 and 156.

For example, if the closed space part of the vehicle includes a normal trunk 155 provided at the rear side of the vehicle and a frunk (i.e., a front trunk) 156 provided at the front side of the vehicle, the second passage part that is connected to the discharge hole of the vacuum pump 154 has a branched configuration into two branch passage parts 131 and 132. In this case, the two branch passage parts 131 and 132 are connected to the trunk 155 and the trunk 156.

Also, discharge passage parts 134 and 135 are connected to the closed space part of the vehicle, for example, the trunk 155 and the trunk 156, respectively, for discharging flammable gas and air temporarily stored therein to the outside.

Also, the second passage part connected to the discharge hole of the vacuum pump 154 may have a structure in which a separate connection passage part 133 is additionally branched, in addition to the branch passage parts 131 and 132 connected to the trunk 155 and the frunk 156.

The connection passage part 133 may be connected to at least one of a discharge passage part connected to the trunk 155 and a discharge passage part connected to the frunk 156. However, in the embodiment illustrated in FIG. 3, the connection passage part 133, branched from the gas passage part (i.e., the second passage part) on the discharge hole side of the vacuum pump 154, is connected to the discharge passage part 135 connected to the frunk 156.

Unlike the illustration, the connection passage part 133 may be connected to the discharge passage part 134 connected to the trunk 155 instead of the discharge passage part 135 connected to the frunk 156. Alternatively, two connection passage parts 133 that are branched from the gas passage part (i.e., the second passage part) on the discharge hole side of the vacuum pump 154 may each be connected to the discharge passage part 134 connected to the trunk 155 and the discharge passage part 135 connected to the frunk 156.

Then, a first on-off valve (e.g., first valve) 181 and a second on-off valve (e.g., second valve) 182 are each installed to the gas passage part 130 connected from the discharge hole of the vacuum pump 154 to the closed space parts 155 and 156 of the vehicle. Specifically, the first valve 181 and the second valve 182 are each installed to each of the respective branch passage parts 131 and 132 that are branched from the gas passage part 130 (second passage part) on the discharge hole side of the vacuum pump 154 and that are connected to the trunk 155 and the frunk 156, respectively.

In addition, a first discharge valve 183 is installed in the discharge passage part 134 connected to the trunk 155, and a second discharge valve 184 is installed in the discharge passage part 135 connected to the frunk 156. Furthermore, a third discharge valve 185 is installed in the connection passage part 133 that is connected to the discharge passage part 135 from the gas passage part 130 on the discharge hole side of the vacuum pump 154.

As shown in FIG. 4, the first on-off valve 181 and the second on-off valve 182, the first discharge valve 183 and the second discharge valve 184, and the third discharge valve 185 are all electromagnetic valves whose opening/closing operation is controlled according to the control signal outputted by the controller 160. For example, each valve may be a solenoid valve, and is installed to open and close the flow path of the corresponding passage part.

When the controller 160 determines that a fire has occurred in the battery pack 1 by the auxiliary fire sensor 150 and the gas sensor 140, the vacuum pump 154 is operated. At the same time, the first on-off valve 181 and the second on-off valve 182 that are installed in the branch passage parts 131 and 132 are opened so that the flammable gas and air discharged after being sucked from the battery pack 1 by the vacuum pump 154 can move to the closed space parts 155 and 156 of the vehicle. The first on-off valve 181 and the second on-off valve 182 that are installed in the branch passage parts 131 and 132 may be opened in a stepwise manner (i.e., opened in order, sequentially, stepwisely, or the like).

Alternatively, when the controller 160 determines that a fire has occurred in the battery pack 1, the third discharge valve 185 installed in the connection passage part 133 is opened. Thus, the flammable gas and air discharged after being sucked in by the vacuum pump 154 are discharged to the outside of the vehicle through the discharge passage part 135.

The fire extinguishing system according to an embodiment of the present disclosure may further include a warning apparatus 200 that operates to warn of the occurrence of a fire. The warning is according to a control signal outputted by the controller 160 when it is determined that a fire has occurred in the battery pack 1 from the signals of the auxiliary fire sensor 150 and the gas sensor 140.

The warning apparatus 200 may include a warning light and/or a sound output apparatus provided to output a warning sound for notifying the occurrence of a fire in the vehicle. The sound output apparatus may include a speaker mounted on the vehicle. In addition, the warning apparatus 200 may further include a display apparatus in the instrument cluster provided to pop-up and display a warning lamp or a warning message in the instrument cluster notifying the occurrence of a fire.

In addition, the fire extinguishing system according to an embodiment of the present disclosure may further include a surrounding information input part 10 that detects or provides information around the vehicle. The surrounding information input part 10 is a component provided to input to the controller 160 the vehicle surrounding information, based on which it is possible to determine whether the current vehicle location is a location where the flammable gas may be discharged externally.

In an embodiment of the present disclosure, the controller 160 determines whether the current vehicle location is a location where flammable gas may be discharged to the outside using the vehicle surrounding information inputted from the surrounding information input part 10. If the vehicle location is a position where the flammable gas may be discharged to the outside, the controller outputs a control signal for discharging the flammable gas generated from the battery pack 1 to the outside of the vehicle.

When determining that the current vehicle position is a position where the external discharge of flammable gas is allowable, the controller 160 may be set to output a control signal for opening the first discharge valve 183 and the second discharge valve 184 to discharge the flammable gas from the vehicle to the outside, or to output a control signal for opening the third discharge valve 185.

Alternatively, when determining that the current vehicle location is a location where the flammable gas may be discharged to the outside, the controller 160 may be set to output a control signal for opening all of the first discharge valve 183, the second discharge valve 184, and the third discharge valve 185.

When the third discharge valve 185 is opened, the controller 160 continuously operates the vacuum pump 154 so that the flammable gas sucked from the battery pack 1 may be discharged to the outside of the vehicle in real time through the connection passage part 133, the third discharge valve 185, and the discharge passage part 135.

The opening of the first discharge valve 183 and the second discharge valve 184 is for discharging the flammable gas and air temporarily stored in the trunk 155 and the frunk 156 to the outside of the vehicle. The trunk 155 and the frunk 156 are closed space parts of the vehicle.

After the controller 160 determines whether the vehicle has moved to a location where flammable gas may be discharged to the outside using the vehicle surrounding information inputted from the surrounding information input part 10, if the vehicle has been moved to a location where the flammable gas may be discharged to the outside, the first and second discharge valves 183 and 184 are opened to allow the flammable gas stored in the trunk 155 and the frunk 156 to be discharged to the outside of the vehicle.

In an embodiment of the present disclosure, based on the vehicle surrounding information inputted from the surrounding information input part 10, the controller 160 may be set to determine that the current vehicle location is a location where the flammable gas may be discharged to the outside when there is no person within a set distance (e.g., 50 m) around the vehicle.

If there is a person within a set distance from the vehicle, the controller 160 may be set to determine that the current vehicle location is a location where external discharge of the flammable gas is prohibited.

In an embodiment of the present disclosure, the surrounding information input part 10 may include an object detection apparatus (not illustrated) mounted on a vehicle. The object detection apparatus is provided to detect an object around the vehicle or to detect a distance from the vehicle to the object and may include a known autonomous driving sensor.

For example, the object detection apparatus may include a camera mounted on a vehicle. The camera may include a plurality of cameras, such as a front camera, a rear camera, and the like, to photograph the surrounding environment around the vehicle. In addition, the object detection apparatus may be a known autonomous driving sensor capable of measuring the distance from the vehicle to the object, for example, a RADAR or a LiDAR, or other in-vehicle sensor.

Also, the surrounding information input part 10 may include a navigation apparatus installed in a vehicle. The vehicle surrounding information is information that can be used to determine a place where flammable gas can be discharged or whether it is possible to discharge flammable gas. The vehicle surrounding information may also include real time vehicle location information and information about buildings and roads around the vehicle.

The navigation apparatus provides the controller 160 with information about buildings and roads around the vehicle obtained from map information, together with vehicle location information obtained through the global positioning system (GPS) receiver. With this information, the controller 160 may match the current vehicle location with information about buildings and roads around the vehicle to determine whether the current vehicle is located in a place where flammable gas discharge is possible or whether it is located in a place where flammable gas discharge is prohibited.

In addition, the controller 160 may determine whether the current vehicle location is a place where flammable gas can be discharged or a place where flammable gas discharge is prohibited from the image around the vehicle provided by the camera or detection information of RADAR or LiDAR. At this time, it is determined (e.g., checked) whether there is a person within a set distance from the vehicle. If there is no person within the set distance, it can be determined as a place where flammable gas can be discharged, and if there is a person within a set distance, it can be determined as a place where flammable gas discharge is prohibited.

The configuration of the fire extinguishing system according to an embodiment of the present disclosure has been described in detail. As described herein, the present disclosure uses a vacuum pump 154 that sucks both the high-temperature flammable gas generated and discharged from the battery pack 1 at the initial stage of a fire and the air present in the battery pack 1 together, and moves the gas and air into the closed space parts 155 and 156 prepared in the vehicle. At this time, the vacuum pump 154 creates or generates (e.g., makes) a vacuum inside of the battery pack 1 (e.g., in a vacuum state), so that the smothering extinguishment can be achieved inside the battery pack 1.

Hereinafter, the overall operating state of the fire extinguishing system is described.

In FIG. 3, arrows indicate air movement paths for pressure balancing of the battery pack 1. In normal times when a fire does not occur, the pressure balancing element 110 and the vent valve 120 of the fire extinguishing system are used for the purpose of allowing gas to enter and exit between the inside and the outside of the battery pack 1 and to balance the pressure. During normal times, the first valve 181 and the second valve 182 are controlled to be in a closed state, and the first discharge valve 183 is controlled to be in an open state.

In addition, in a state in which the atmosphere port 123 and the connection port 124 of the vent valve 120 are both open, gas enters and exits between the inside and the outside of the battery pack 1 through the pressure balancing element 110 and the vent valve 120. As the gas moves in the direction of the arrow, pressure is balanced between the inside and the outside of the battery pack 1.

Since the connection port 124 is a port that is always open, gas (air) may also flow through the connection port 124 and the gas passage part 130 connected thereto during normal times. In addition, when a fire occurs, the flammable gas generated from the battery pack 1 flows into the gas passage part 130 through the connection port 124 and passes through the gas sensor 140.

The fire extinguishing system according to an embodiment of the present disclosure first performs primary fire extinguishment at the initial stage of a fire. In this case, the primary fire extinguishment is the smothering extinguishment using the vacuum pump. After the primary fire extinguishment, the controller 160 continuously monitors the battery cell temperature detected through the temperature sensor 8, and when the battery cell temperature detected through the temperature sensor 8 is equal to or higher than the set temperature (e.g., 100° C.), the secondary fire extinguishment is performed.

The secondary fire extinguishment is cooling fire extinguishment in which the fire extinguishing agent stored in the fire extinguishing agent tank 170 is supplied and sprayed to the inside of the battery pack 1, where a fire has occurred, through the fire extinguishing agent supply passage part 171 to extinguish the fire. This cooling fire extinguishment can be said to be a fire extinguishment process to respond to fire re-ignition, which is performed after the smothering extinguishment.

During the cooling fire extinguishment, the controller 160 opens the fire extinguishing agent supply valve 172. When the fire extinguishing agent supply valve 172 is opened, the fire extinguishing agent stored in the fire extinguishing agent tank 170 may be automatically supplied and injected into the battery pack 1 through the fire extinguishing agent supply passage part 171.

When the fire extinguishing agent is supplied and sprayed into the battery pack 1, the battery cells inside the battery pack 1 are all contaminated by the fire extinguishing agent, so the battery cells cannot be recycled and must be disposed of. Therefore, after performing the smothering extinguishment primarily, it is advantageous to perform the cooling fire extinguishment secondarily using a fire extinguishing agent only when the fire is not extinguished by the smothering extinguishment.

If complete fire extinguishment can be achieved only by the smothering extinguishment, there is no need to perform the secondary cooling fire extinguishment, thus avoiding contamination of the battery cells, so some of the entire battery cells can be recycled. Thus, it is advantageous to set the order of the smothering extinguishment and the cooling fire extinguishment in advance.

After the primary fire extinguishment, the inside of the battery pack 1 is already in a vacuum state by the vacuum pump 154. Thus, by opening the fire extinguishing agent supply valve 172, the fire extinguishing agent in the fire extinguishing agent tank 170 may be automatically moved and injected into the battery pack 1.

The use of a separate driving source or pressurization source such as a compressor for supplying and spraying the fire extinguishing agent stored in the fire extinguishing agent tank 170 to the inside of the battery pack 1 is unnecessary. In addition, if a fire extinguishing agent mixed with high-pressure nitrogen is used in the extinguishing liquid, it can be sprayed even with the fire extinguishing agent's own pressure.

In addition, when the fire extinguishing agent supply valve 172 is opened, the fire extinguishing agent in the fire extinguishing agent tank 170 only moves toward the battery pack 1 through the fire extinguishing agent supply passage part 171. The fire extinguishing agent cannot pass through the vent part 111 of the pressure balancing element 110. This is because the ventilation waterproofing membrane member 117 is installed in the vent part 111 as described herein, and the fire extinguishing agent cannot pass through the ventilation waterproofing membrane member 117.

Therefore, a separate valve for preventing the fire extinguishing agent, which is supplied from the fire extinguishing agent tank 170 to the battery pack 1, from passing through the vent part 111 of the pressure balancing element 110 is unnecessary.

Figure 10:
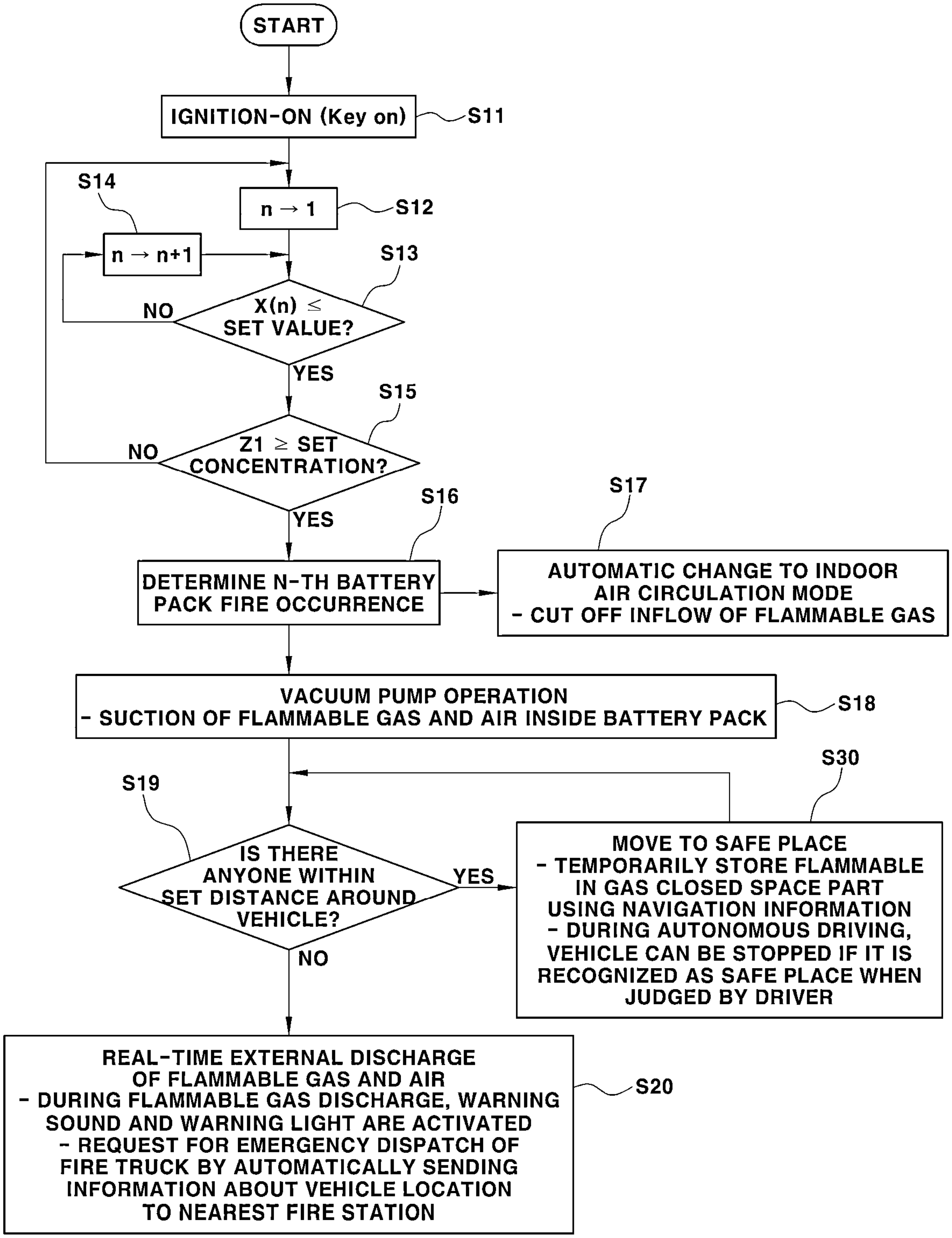
FIG. 10 is a flowchart illustrating an overall operation process of a fire extinguishing system for a battery according to an embodiment of the present disclosure.

FIG. 10 is a flowchart illustrating an overall operation process of the fire extinguishing system for a battery according to an embodiment of the present disclosure. An example in which a plurality of (n) battery packs are mounted in a vehicle is described.

In the vehicle ignition-on (Key on) state (S11), the controller 160 monitors in real time whether or not a fire has occurred in the battery pack 1 from the signals of the auxiliary fire sensor 150 and the gas sensor 140 (S12 to S15). When a fire occurs in the battery pack 1, gas is released from the battery pack in which the fire occurred. The gas released from the battery pack passes through the pressure balancing element 110 and the vent valve 120 in sequence and then flows along the gas passage part 130.

At this time, the controller 160 can determine whether or not a fire has occurred in the battery pack 1 from the signal of the gas sensor 140 and can identify the battery pack 1 in which the fire actually occurred among all the battery packs 1 from the signal of the auxiliary fire sensor 150.

When describing the process of identifying the battery pack in which the fire has occurred, the controller 160 reads and monitors in real time the signal value of the auxiliary fire sensor 150 installed for each battery pack 1, i.e., the value of the current flowing through the wiring 153 of each auxiliary fire sensor 150. The controller 160 checks whether the current value (X(n)) of each wiring 153 is less than or equal to a set value (e.g., 500 mA) (S12 to S14).

The gas discharged from the battery pack 1 in which the fire has occurred and has passed through the pressure balancing element 110 flows into the vent valve 120. The gas flowing into the vent valve 120 moves by pushing the valve body 125. The valve body 125 overcomes the force of the spring 126 and is moved to a position where the atmosphere port 123 is closed so that gas is not released into the atmosphere through the atmosphere port 123 (see FIG. 7).

In this way, after the valve body 125 is moved to the closed position of the atmosphere port 123, the first magnet resistor 151 and the second magnet resistor 152 of the auxiliary fire sensor 150 are attached to and in contact with each other (see FIG. 7). The controller 160 can read the current value flowing through the wiring 153.

The controller 160 determines that a fire has occurred in the corresponding battery pack 1 when the value of the current flowing through the wiring 153 is less than or equal to the set value (or the amount of change in the current value is greater than or equal to the set value). As a result, the controller 160 can identify the battery pack 1 in which a fire has occurred among all the battery packs 1.

In addition, after being discharged from the battery pack 1, the gas passing through the pressure balancing element 110 and the vent valve 120 sequentially flows into the first passage part 130*a* of the gas passage part 130. Thereafter, the gas passes through the gas sensor 140 installed in the first passage part 130*a*.

In the gas sensor 140, the concentration Z1 of a specific component in the gas passing through the first passage part 130*a*, for example, carbon monoxide (CO), can be detected. Thus, a signal according to the concentration of the specific component in the gas can be outputted to the controller 160.

Accordingly, the controller 160 checks whether the concentration (Z1) of the specific component in the gas is equal to or greater than the set concentration (e.g., 20 ppm) from the signal of the gas sensor 140 (S15). When it is equal to or greater than the set concentration ('Z1≥set concentration'), the controller 160 finally determines that a fire has occurred in the battery pack 1 (which is the 'n-th battery pack' in FIG. 10) in which the fire has been detected by the auxiliary fire sensor 150 (S16).

Thus, even if the current value, which is the signal value of the auxiliary fire sensor 150, is less than or equal to the set value in step S13, only when the concentration (Z1) of carbon monoxide (CO) in the gas detected by the gas sensor 140 is greater than or equal to the set concentration in step S15, is it finally determined that a fire has occurred in the battery pack 1, thereby reducing the risk of malfunction.

When finally determining that a fire has occurred in the battery pack 1, the controller 160 automatically changes the air circulation mode of the vehicle air conditioner to an indoor air circulation mode, i.e., an indoor air mode to block the inflow of flammable gas into the vehicle interior (S17). The controller 160 activates the warning apparatus 200 to warn the driver and passengers of the occurrence of a fire.

Then, the controller 160 outputs a control signal for extinguishing the fire to perform a fire extinguishment control process. The controller operates the vacuum pump 154 first, so that flammable gas and air are sucked by the vacuum pump 154 from the battery pack 1 in which a fire has occurred (S18).

Then, the controller 160 checks whether there is a person within a set distance (e.g., 50 m) around the vehicle based on the vehicle surrounding information inputted from the surrounding information input part 10 (S19). If there is no person within the set distance, the controller 160 opens the third discharge valve 185 installed in the connection passage part 133 so that the flammable gas and air sucked and discharged by the vacuum pump 154 are discharged in real time to the outside of the vehicle through the connection passage part 133 and the discharge passage part 135 (S20). At this time, the first on-off valve 181, the second on-off valve 182, the first discharge valve 183, and the second discharge valve 184 all maintain a blocked state.

At this time, the controller 160 may operate the warning apparatus 200 to notify the external discharge of flammable gas to the surroundings of the vehicle. The controller 160 may transmit vehicle location information to a nearby fire station using a communication apparatus mounted on the vehicle to perform an emergency dispatch request for the fire engine.

In addition, if there is a person within the set distance in step S19, the controller 160 checks the navigation information provided from the navigation apparatus. The controller 160 then performs cooperative control together with the autonomous driving controller of the vehicle for autonomous driving by moving the vehicle to the nearest place where there are no people and there is no risk of the fire spreading (S21).

At this time, the controller 160 maintains the operating state of the vacuum pump 154 and moves and temporarily stores the flammable gas and air sucked in by the vacuum pump 154 to the closed space parts 155 and 156 of the vehicle.

During autonomous driving of the vehicle, if the driver determines that the vehicle's location is a safe place, the driver can stop the vehicle by switching it to the manual driving mode. When the vehicle is in a stopped state after being switched to the manual driving mode, the controller 160 opens the third discharge valve 185 installed in the connection passage part 133 so that the flammable gas and air sucked in by the vacuum pump 154 are discharged to the outside of the vehicle in real time through the connection passage part 133 and the discharge passage part 135.

Figure 11:
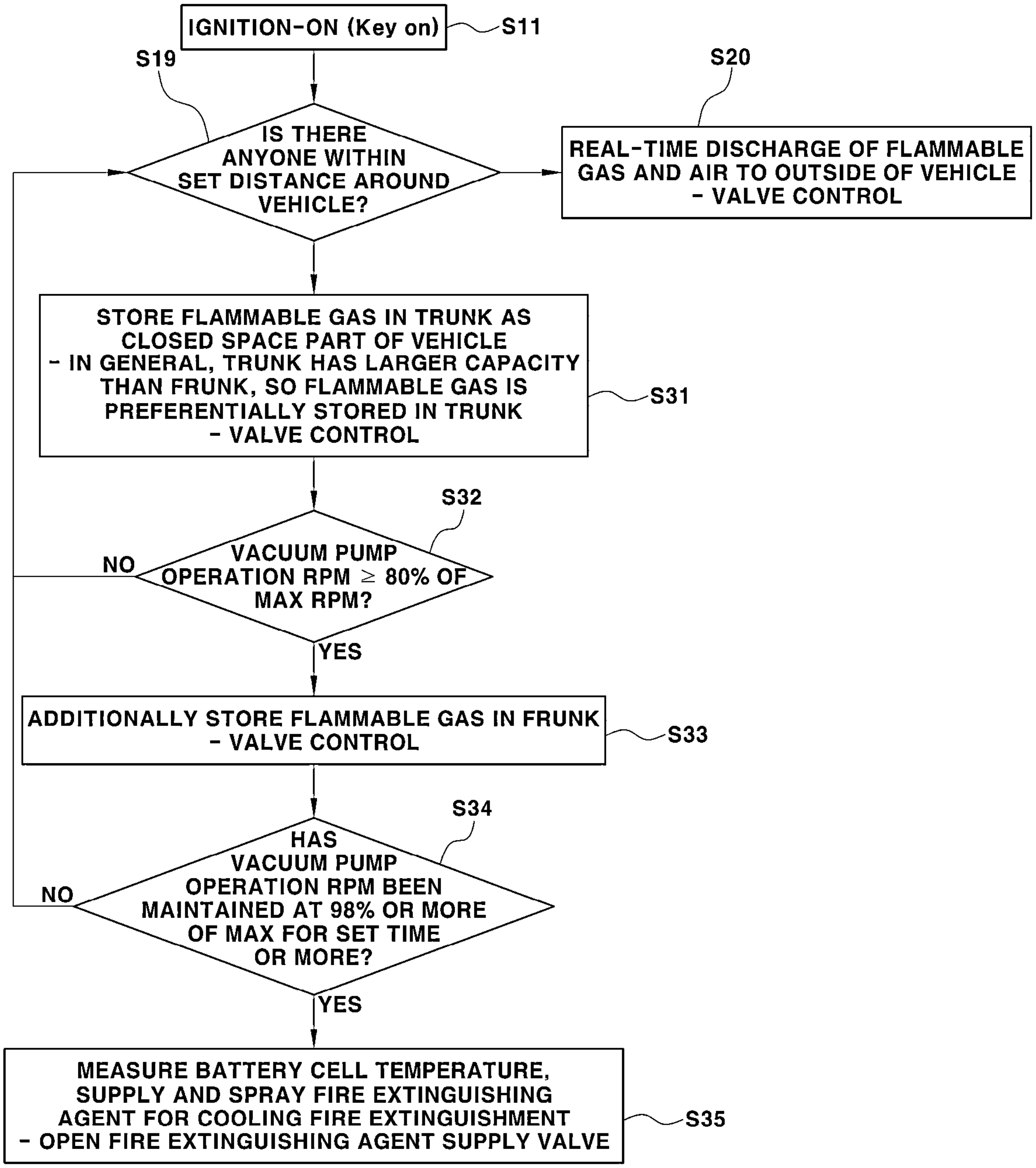
FIG. 11 is a flowchart illustrating in more detail an operation process of a fire extinguishing system for a battery, according to an embodiment of the present disclosure, during a primary fire extinguishment.
Figure 12:
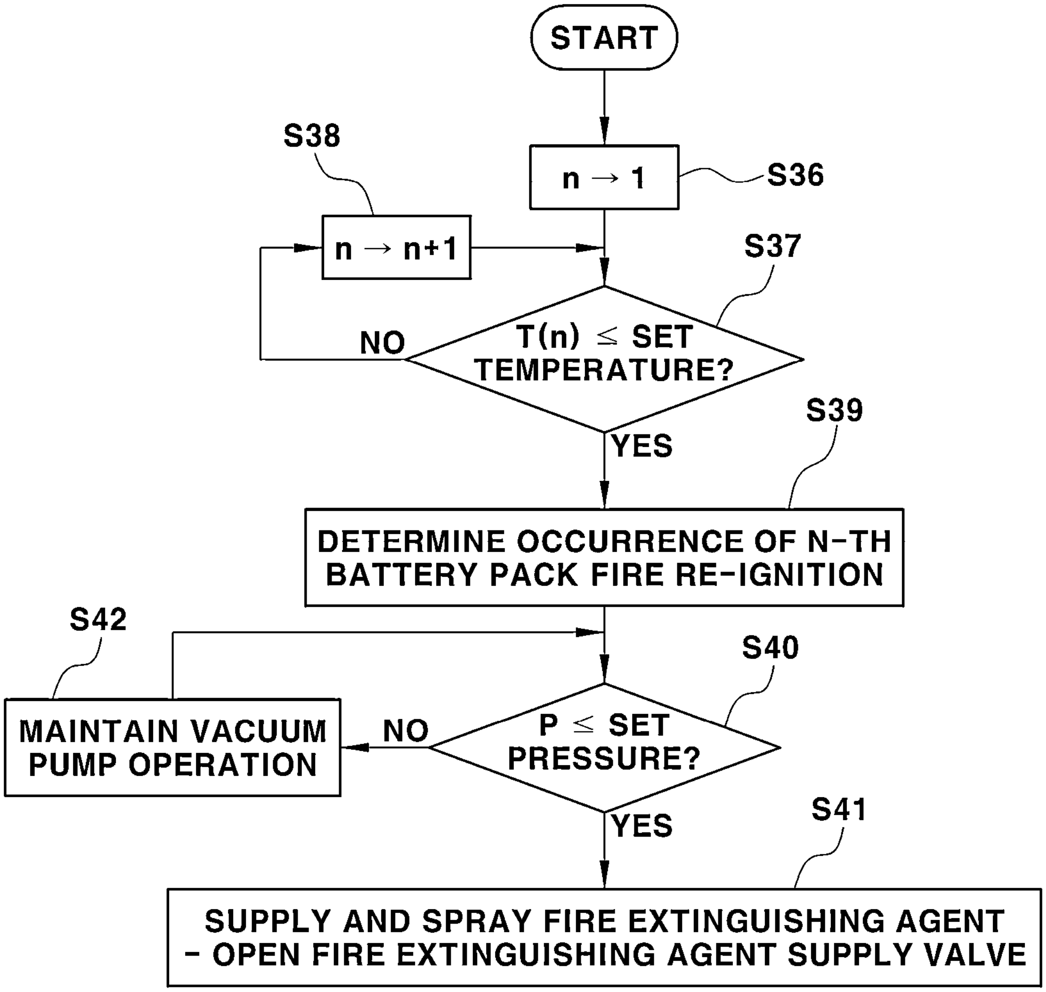
FIG. 12 is a flowchart illustrating a process for performing a secondary fire extinguishment of a fire extinguishing system for a battery according to an embodiment of the present disclosure.

FIG. 11 is a flowchart illustrating in more detail an operation process of a fire extinguishing system for a battery in case of a battery fire according to an embodiment of the present disclosure. FIG. 12 is a flowchart illustrating a process in which fire re-ignition and cooling fire extinguishment of the fire extinguishing system for a battery are performed, according to an embodiment of the present disclosure.

Steps S19 and S20 in FIG. 11 are the same steps as steps S19 and S20 of FIG. 10, and steps S11 to S18 shown in FIG. 10 are omitted from FIG. 11.

When determining that there is a person within the set distance around the vehicle in step S19, the controller 160 moves and temporarily stores the flammable gas and air generated in the battery pack 1 and sucked by the vacuum pump 154 to the closed space parts 155 and 156 of the vehicle. At this time, since the volume of the trunk 155 is larger than that of the frunk 156 in a conventional vehicle, the flammable gas may be advantageously stored in the trunk (S31).

The controller 160 opens the first on-off valve 181 so that the flammable gas and air sucked in by the vacuum pump 154 are moved and stored to the trunk 155 through the first on-off valve 181 and the branch passage part 132. In addition, the second on-off valve 182 is maintained in a blocked state, and the first discharge valve 183, the second discharge valve 184, and the third discharge valve 185 are also maintained in a blocked state.

Thereafter, the controller 160 gradually increases the operating speed, i.e, revolutions per minute (RPM) or operational rotation number of the vacuum pump 154 according to a set change rate. When the operating RPM of the vacuum pump 154 is greater than or equal to the value of the first set ratio (%) (e.g., 80%) for the preset maximum RPM (maximum rotation speed) (S32), the controller additionally moves and temporarily stores the flammable gas and air to the frunk 156 (S33).

At this time, the controller 160 additionally opens the second on-off valve 182 so that the flammable gas and air sucked in by the vacuum pump 154 are moved and stored to the frunk 156 through the second on-off valve 182 and the branch passage part 132. The first discharge valve 183, the second discharge valve 184, and the third discharge valve 185 are all maintained in a blocked state.

After the operating RPM of the vacuum pump 154 reaches the value of the second set ratio (%) for the maximum RPM (e.g., 98%, the second set ratio>the first set ratio), and if it continues for a set time or more (S34), the controller 160 monitors the battery cell temperature in each battery pack from the signal of the temperature sensor 8 installed for each battery pack 1 (S35).

At this time, if it is determined based on the battery cell temperature that there is a fire re-ignition state, the controller 160 opens the fire extinguishing agent supply valve 172 so that the fire extinguishing agent can be supplied and sprayed into the battery pack 1 where the fire re-ignition has occurred. Then, the fire extinguishing agent stored in the fire extinguishing agent tank 170 is supplied and sprayed into the corresponding battery pack 1 through the fire extinguishing agent supply passage part 171.

The fire re-ignition response process is described with reference to FIG. 12. While monitoring the battery cell temperature detected by the temperature sensor 8 installed for each battery pack 1, when the battery cell temperature is equal to or higher than the set temperature (e.g., 100° C.), the controller 160 determines that fire re-ignition has occurred inside the corresponding battery pack 1 (S36-S39).

The controller 160 then opens the fire extinguishing agent supply valve 172, allowing the fire extinguishing agent to be supplied and sprayed from the fire extinguishing agent tank 170 through the fire extinguishing agent supply passage part 171 to the inside of the battery pack 1 where a fire has occurred to be sprayed (S42).

At this time, when the pressure detected through the pressure sensor (reference numeral '9' in FIG. 4), i.e., the internal pressure of the battery pack 1 in which fire re-ignition has occurred, is in a vacuum pressure state that is less than or equal to the set pressure (e.g., 100 Pa) (S40), the controller 160 can cause the fire extinguishing agent to be supplied and sprayed (S41). However, if the internal pressure of the battery pack 1 does not reach the set pressure, the operating state of the vacuum pump 154 is maintained until the set pressure is reached (S42).

When the internal pressure of the battery pack 1 is less than or equal to the set pressure, it means that the internal pressure of the battery pack 1 is in a vacuum state lower than atmospheric pressure. As such, when the internal pressure of the battery pack 1 is in the vacuum state, a strong injection pressure may be formed by the pressure difference between the battery pack 1 and the fire extinguishing agent tank 170.

As a result, when the fire extinguishing agent supply valve 172 is opened, the fire extinguishing agent of the fire extinguishing agent tank 170 can be supplied into the battery pack 1 in the vacuum state through the fire extinguishing agent supply passage part 171 without a separate pressurization source.

In addition, high-pressure nitrogen may be mixed with the fire extinguishing agent in an appropriate ratio so that all the fire extinguishing agents inside the fire extinguishing agent tank 170 can be sprayed into the battery pack 1. If the injection pressure of the fire extinguishing agent is not sufficient, only some extinguishing agents in the fire extinguishing agent tank may be injected into the battery pack 1.

While the fire extinguishing agent is supplied to the inside of the battery pack 1 as described herein, the third discharge valve 185 is opened, and the remaining valves, i.e., the first discharge valve 183, the second discharge valve 184, the first on-off valve 181, and the second on-off valve 182 are all shut off.

The time point for performing the secondary fire extinguishment (cooling fire extinguishment) for fire re-ignition, by supplying a fire extinguishing agent, is the time when the primary fire extinguishment process, i.e., the smothering extinguishment, has already been performed. Additionally, the vehicle that is already in a safe place where the flammable gas may be discharged may quickly make the inside of the battery pack 1 into an optimal state for spraying the extinguishing liquid. Thus, the flammable gas is discharged directly to the outside of the vehicle through the third discharge valve 185, the connection passage part 133, and the discharge passage part 135 without passing through the trunk 155 or the frunk 156.

In this way, the battery fire extinguishing system and the control process thereof according to the present disclosure have been described in detail. According to the present disclosure described herein, it is possible to quickly and accurately sense a fire occurring in a battery of a vehicle, and to effectively extinguish the fire immediately upon the sensing.

In particular, in the present disclosure, high-temperature flammable gas emitted from the battery pack in the event of a fire can be sucked in using a vacuum pump and temporarily stored in the closed space of the vehicle. In this process, the fire of the battery pack can be extinguished by the smothering.

In this way, when the fire in the battery pack is first extinguished through the smothering extinguishment at the initial stage of the fire, it is possible to recycle some of the cells inside the battery pack after extinguishing the fire because no extinguishing agent is used.

In addition, when a fire re-ignition occurs after the smothering extinguishment has created a vacuum state on the inside of the battery pack using a vacuum pump, a fire extinguishing agent can be supplied to the inside of the battery pack in the vacuum state to extinguish the re-ignited fire.

At this time, since the inside of the battery pack where the fire re-ignition has occurred is in the vacuum state, it is possible to supply the fire extinguishing agent in the fire extinguishing agent tank to the battery pack without a separate pressurization source such as a pump or a compressor. Accordingly, it is possible to reduce the installation cost of the apparatus. Additionally, the fire extinguishment is possible even in an emergency situation in which power supply for driving a pump or a compressor is impossible.

In addition, in the present disclosure, since a simple and inexpensive auxiliary fire sensor is installed for each battery pack, and a gas sensor (gas concentration measuring sensor) for measuring the gas concentration is installed in the common gas passage part to which each battery pack is connected, it is possible to both detect a battery fire and identify a battery pack in which a fire has occurred by using only minimum gas sensors for a plurality of battery packs.

In addition, by using a low-cost auxiliary fire sensor to classify and identify a battery pack in which a fire has occurred, and by installing a gas sensor in a common gas passage part and using it to finally confirm the occurrence of a battery fire, it is possible to prevent false detection of fire and significantly reduce the cost compared to the case of installing an expensive gas concentration measuring sensor for each battery pack as in the prior art.

In addition, since the fire extinguishing system of the present disclosure performs the function of a conventional pressure balancing element, the pressure balancing of the battery pack is possible without the need to install multiple pressure balancing elements in the battery pack.

While the embodiments of the present disclosure have been described in detail herein, the scope of the patent right of the present disclosure is not limited thereto. Various modifications and improvements which could be made by those having ordinary skill in the art using the basic concept of the present disclosure defined in the following claims would also fall within the scope of the patent right of the present disclosure.

REFERENCE SIGN LIST

| | |
|---|---|
| 1: Battery pack | 2: Battery case |
| 3: Battery cell | 4: Pressure balancing element |
| 5: Plate | 6: Vent part |
| 7: Vent hole | 8: Temperature sensor |
| 9: Pressure sensor | 10: Surrounding information input part |
| 110: Pressure balancing element | 111: Vent part |
| 112: Vent hole | 113: Connector |
| 113a: Large-diameter part | 113b: Reduced pipe part |
| 113c: Small-diameter part | 114: Sealing protrusion |
| 115: Sealing member | 116: Vent passage part |
| 117: Ventilation waterproofing membrane member | |
| 120: Vent valve | |
| 121: Valve housing | 122: Vent port |
| 123: Atmosphere port | 124: Connection port |
| 125: Vale body | 126: Spring |
| 127: Buffer member | 128: Entry and exit passage part |
| 130: Gas passage part | 130a: First passage part |
| 131, 132: Branch passage parts | 133: Connect passage part |
| 134, 135: Discharge passage parts | 140: Gas sensor |
| 150: Auxiliary fire sensor | 151: First magnetic resistor |
| 152: Second magnetic resistor | 153: Wiring |
| 154: Vacuum pump | 155: Trunk |
| 156: Frunk | 160: Controller |
| 170: Fire extinguishing agent tank | |
| 171: Fire extinguishing agent supply passage part | |
| 172: Fire extinguishing agent supply valve | |
| 181: First on-off valve | |
| 182: Second on-off valve | 183: First discharge valve |
| 184: Second discharge valve | 185: Third discharge valve |
| 200: Warning apparatus | |

What is claimed is:

1. A fire extinguishing system for a battery of a vehicle, the system comprising:

a gas discharge part installed in a battery pack of the vehicle and configured to discharge a gas from inside the battery pack;

a gas passage part through which a gas can flow, the gas generated inside the battery pack when a fire occurs and discharged through the gas discharge part;

a controller, which outputs a control signal for fire extinguishment when a fire occurs inside the battery pack;

a vacuum pump installed in the gas passage part to operate according to the control signal outputted from the controller and configured to perform smothering extinguishment of fire that is inside the battery pack by sucking gas and air out of the battery pack during operation; and a closed space part provided in the vehicle so that the gas and air sucked by the vacuum pump can be moved and stored to the closed space part through the gas passage part, wherein the gas passage part includes a first passage part connected from the gas discharge part to a suction port of the vacuum pump, and a second passage part connected from a discharge hole of the vacuum pump to the closed space part, the system further comprising:

a connection passage part which is branched from the second passage part and is connected to a discharge passage part for discharging gas to the outside of a vehicle;

a first discharge valve, which is installed in the connection passage part and whose opening and closing operation is controlled by the controller, and a surrounding information input part that detects or provides information around a vehicle, wherein the controller determines whether a current vehicle location is a location where a gas generated inside the battery pack can be discharged to the outside of the vehicle based on the vehicle surrounding information inputted from the surrounding information input part, and opens the first discharge valve installed in the connection passage part so that the gas generated inside the battery pack is discharged to the outside of the vehicle, when determining that the gas can be discharged to the outside of the vehicle.

2. The system of claim 1, further comprising:

a gas sensor that is installed in the gas passage part, the gas sensor configured to sense a fire occurring inside the battery pack through the gas generated inside the battery pack and flowing along the gas passage part, and configured to transmit a fire sensing signal to the controller.

3. The system of claim 1, further comprising:

a second discharge valve, which is installed in the discharge passage part and whose opening and closing operation is controlled by the controller.

4. The system of claim 1, wherein, when determining that the current vehicle location is a location where the discharge of the gas to the outside of the vehicle is prohibited, the controller operates the vacuum pump to perform smothering extinguishment for a fire inside the battery pack, and at the same time, stores the gas and air sucked by the vacuum pump in the closed space part.

5. The system of claim 4, wherein when determining that the current vehicle location is a location where the discharge of the gas to the outside of the vehicle is prohibited, the controller is configured to perform autonomous driving control to move the vehicle to a location where the gas may be discharged to the outside of the vehicle using navigation information provided by a navigation apparatus, and the controller is configured to open the first discharge valve in the connection passage part so that the gas generated inside the battery pack is discharged to the outside of the vehicle, after being moved to a location where the gas may be discharged to the outside of the vehicle.

6. The system of claim 1, wherein the vehicle is provided with a plurality of closed space parts whose inner spaces can be sealed, and wherein the gas passage part that is connected to the discharge hole of the vacuum pump is branched into a plurality of branch passage parts, each branch passage part being connected to each of the closed space parts, and wherein each branch passage part is provided with an on-off valve whose opening and closing operation is controlled by the controller.

7. The system of claim 6, wherein each discharge passage part of a plurality of discharge passage parts is connected to each of the closed space parts to discharge the gas stored in each of the closed space parts to an outside of a vehicle, and wherein each of the discharge passage parts is provided with a discharge valve whose opening and closing operation is controlled by the controller.

8. The system of claim 7, wherein the connection passage part is connected to at least one of the plurality of discharge passage parts connected to each of the closed space parts, and wherein the connection passage part is provided with a discharge valve whose opening and closing operation is controlled by the controller.

9. The system of claim 8, further comprising:

a surrounding information input part that detects or provides information around a vehicle, wherein the controller determines whether a current vehicle location is a location where the gas generated inside the battery pack can be discharged to the outside of the vehicle based on the vehicle surrounding information inputted from the surrounding information input part, and opens a discharge valve installed in the connection passage part so that the gas generated inside the battery pack is discharged to the outside of the vehicle, when determining that it is a location where the gas can be discharged to the outside of the vehicle.

10. The system of claim 6, wherein the plurality of closed space parts includes a trunk provided on a rear side of the vehicle, and a frunk provided on a front side of the vehicle.

11. The system of claim 10, wherein the controller gradually increases a speed of the vacuum pump when the vacuum pump is operated, and stepwisely opens a first on-off valve installed in a branch passage part connected to the trunk and a second on-off valve installed in a branch passage part connected to the frunk according to a rotation state of the vacuum pump, so that the gas and air sucked by the vacuum pump are sequentially stored in the trunk and the frunk.

12. The system of claim 11, wherein the controller is configured to first open the first on-off valve of the branch passage part connected to the trunk and then to open the second on-off valve of the branch passage part connected to the frunk.

13. The system of claim 1, further comprising:

a fire extinguishing agent tank in which a fire extinguishing agent for extinguishing a fire inside the battery pack is stored;

a fire extinguishing agent supply passage part provided to supply the fire extinguishing agent stored in the fire extinguishing agent tank to the inside of the battery pack; and a fire extinguishing agent supply valve installed in the fire extinguishing agent supply passage part and opened by the control signal outputted from the controller.

14. The system of claim 13, wherein the controller monitors a battery cell temperature of the battery pack detected by a temperature sensor after extinguishing the fire by smothering extinguishment that operates the vacuum pump, and opens the fire extinguishing agent supply valve so that the fire extinguishing agent stored in the fire extinguishing agent tank is supplied to the inside of the battery pack when the detected battery cell temperature is greater than or equal to a set temperature.

15. The system of claim 14, wherein the controller opens the fire extinguishing agent supply valve when the detected battery cell temperature is equal to or greater than the set temperature and a pressure inside the battery pack detected by a pressure sensor is in a vacuum pressure state equal to or lower than a set pressure.

16. The system of claim 1, wherein the controller controls an air circulation mode of a vehicle air conditioner to an interior air mode when a fire occurs inside the battery pack.

* * * * *